Patented Aug. 11, 1942

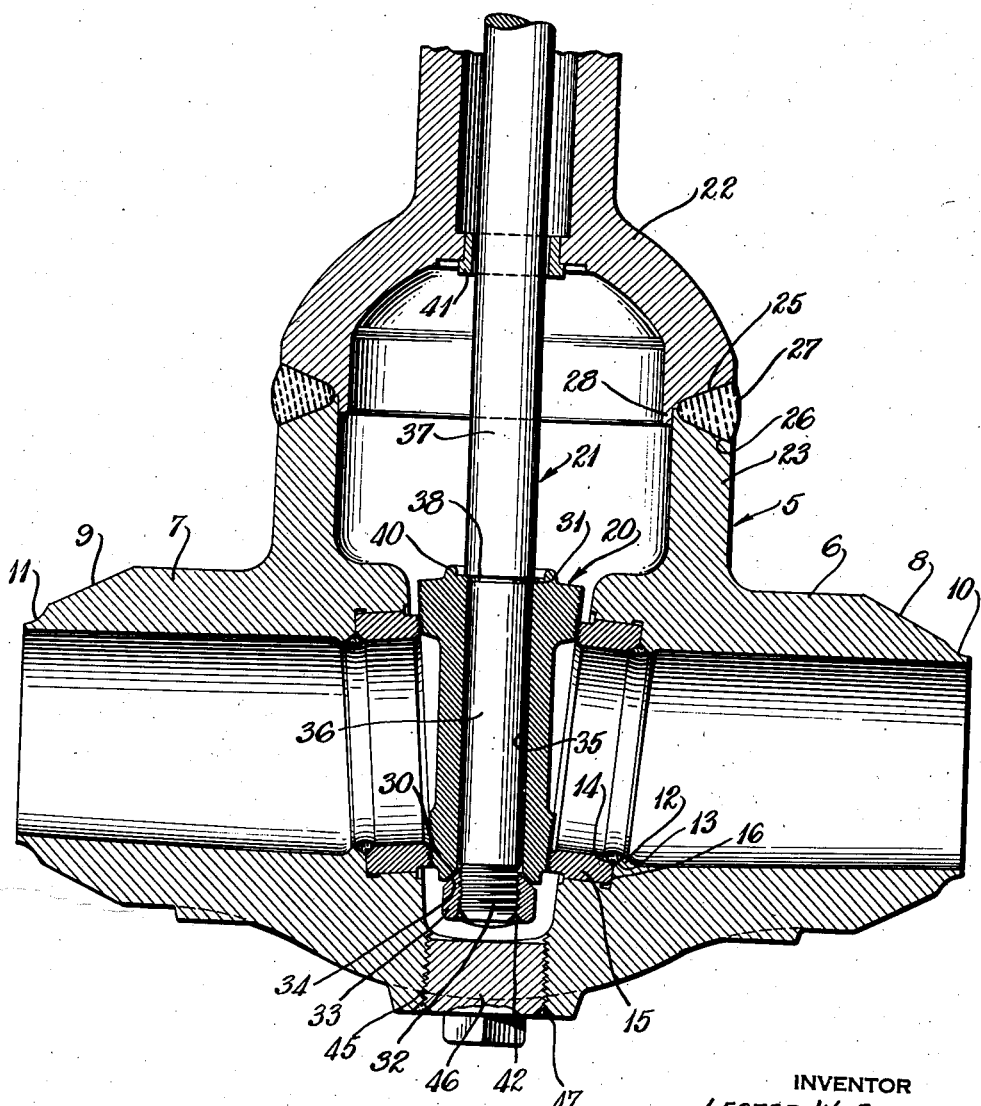

2,292,780

UNITED STATES PATENT OFFICE 2,292,780

VALVE

Lester W. Benoit, Shillington, Pa., assignor to American Chain & Cable Company, Inc., New York, N. Y., a corporation of New York Application February 14, 1940, Serial No. 318,799

4 Claims. (Cl. 251—59)

This invention relates to high pressure gate valves.

With the introduction of high temperature high pressure steam working conditions in central power stations, considerable trouble has been experienced with bolted connections. This trouble has been overcome in the pipe lines themselves and their connection with the bolted hubs of the valve body by welding the various joints so that the whole pipe system becomes one unit throughout its entire length. No special difficulty has been experienced in welding the valve runs or hubs of the valve body into pipe lines because the length of the welding period and the amount of heat developed may be proportionate to the wall thickness of the pipe and also because the length of the hubs is such that the welding temperatures do not run far back enough to damage the valve seating surfaces.

It has also been proposed to weld the bonnet to the valve body but this cannot be accomplished as readily as welding the valve body into the pipe line for the reason that the valve bonnet and valve body are of heavy cross sections and the time of welding and the length of time for stress relieving causes the heat to run down into the valve body and possibly cause damage to the valve seats. It is therefore an object of this invention to provide a valve construction in which the valve seat rings may be welded in position on the valve body and the valve seated on the rings and then the bonnet welded to the valve body after which the entire valve construction may be relieved without injury to any of the parts of the valve and valve stem connection which will permit of assembling a permanent valve stem with the valve after the stress relieving has been effected.

Other objects of the invention will appear from the following description taken in connection with the single figure in the drawing which is a vertical and longitudinal section of the valve assembly.

In the single figure of the drawing the body of the valve is indicated generally at 5 and includes the usual hubs 6 and 7, the ends of which may be tapered as indicated at 8 and 9 and provided with complementary welding grooves 10 and 11 for connecting the valve body into the pipe line by welding as is understood. The inner ends of the bores or through-ports are identical each being provided with a shoulder 12 having its inner side 13 flared or beveled to form in connection with a bevel 14 on a valve seat ring 15 a welding groove to receive welding material by means of which the valve seat ring after it has been placed on the shoulder 16, may be secured and sealed in the valve body. The inner or seating surface of the valve seat ring may be machined and finished before the valve seat ring is inserted and welded in place.

Cooperating with the valve seat rings 15 whose valve seating surfaces are inclined relatively to each other as disclosed, is a wedge gate valve 20 which is moved from open to closed position by means of a stem 21 projecting upwardly through a stuffing box in the bonnet 22 to the exterior of the bonnet and any suitable means may be provided for raising and lowering the valve stem and valve and for preventing rotation of the valve. The usual bolted connections between the flanged bonnet and valve body have been a source of trouble and in accordance with my invention I have eliminated the flanges and the necessity for using packings by providing the opposed faces of the ends of the bonnet 22 and upstanding member 23 with complementary grooves 25 and 26 for the reception of welding material as indicated at 27 by means of which the bonnet may be secured to the upstanding member 23 of the valve body and also be effectively sealed on the valve body. For the purpose of convenience and strength the lower end of the bonnet may be provided with a depending flange 28 fitting into the interior of the upstanding member 23 as indicated.

The lower end of the valve 20 may be provided with a beveled valve stem seat 30 and its upper end may be provided with a beveled valve stem seat 31. The valve stem 21 is provided with a lower reduced threaded end 32 upon which is threaded a nut 33 provided with a beveled valve seat 34 for cooperation with the valve stem seat 30. The valve 20 is provided with a through hole 35 through which the lower section 36 of the valve stem passes, the diameter of the valve stem at this point being smaller than that of the diameter of the hole in the valve.

The upper section 37 of the valve stem is of increased diameter and a beveled shoulder or valve seat 38 between the sections 36 and 37 is adapted to engage the beveled valve stem seat 31 of the valve. The distance between the seats 34 and 38 is slightly greater than the distance between the seats 30 and 31 so that the valve may swivel on the valve stem for purposes well understood.

The upper end of the valve 20 is provided with a back seating under pressure rib or surface 40 which may be machined to seat tightly against a gland 41 in the lower end of the valve stem hole in the bonnet, so that when the valve is lifted into its uppermost position a tight seal will be made between the back seating surface 40 and the gland 41 and between the beveled seat 34 on the lower end of the valve stem and the beveled valve stem seat 30 on the valve, thus permitting the stuffing box to be repacked while there is a flow of high pressure fluid through the valve. The nut 33 may be seal-welded on the valve stem 21 to prevent leakage of fluid past the threads as indicated at 42. Access may be had to remove grit from the valve body and for the purpose of welding the nut 33 to the valve stem, through a threaded port 45 in the lower end of the valve body which may be closed by a threaded plug 46 which may be seal-welded in position as indicated at 47.

It is obvious from the disclosure that the valve stem may be assembled in position after the bonnet has been welded on to the valve body. This construction is provided so that a temporary valve stem may be used if desired to hold the valve on its seat during the bonnet welding and stress relieving operation in order that the permanent valve stem which is usually made of 12 to 14% chromium steel may be assembled later, as the heat treatment of the permanent valve stem is such that if it were put under stress relieving temperatures the desired physical properties of the valve stem would be destroyed.

The valve assembly disclosed has a special type of wedge valve and valve stem connection. The valve body and bonnet castings of the usual construction are two separate castings, each having a large flange by means of which the castings are bolted together. In accordance with my invention the castings may be provided with a welding groove by a simple machine operation. The valve body may be machined in the usual manner, that is, by completely machining both shoulders on which the valve seat rings rest and inserting and seal welding the valve seat rings. The bonnet will also be machined by the usual methods except for the welding groove machined in the bottom of the bonnet.

The wedge valve is machined with a hole through the center and chamfered or beveled seats at both the upper and lower ends of the hole. The upper edge of the wedge valve is also machined with a back seating under pressure seating surface. The valve stem is machined with three steps in its diameter. The first step is at the lower end of the valve stem and is threaded. A nut with a chamfered collar or with a chamfered end or beveled valve seat is screwed on to this thread and the thread seal-welded to prevent leakage of pressure along the thread of the connection. The portion of the valve stem within the wedge valve proper is of slightly larger diameter while the upper end of the valve stem is of still larger diameter, the two different diameters being connected by a chamfered or beveled valve seat.

When the seat rings have been secured in the valve body, the wedge valve may be put in place on the seat rings. The bonnet will then be put in position ready for welding. The welding will be made in the conventional welding method but will not be stress relieved at this operation. Instead of inserting the permanent valve stem which will be furnished with the valve, a temporary valve stem of some other material will be inserted in the wedge valve and against the valve stem seat 38 on the valve to force the valve down on to its seat rings. The whole valve assembly can then be put in a furnace which has its atmosphere controlled and the temperature of the furnace raised to a point to stress relieve the weld. By this method not only the bonnet joint weld will be stress relieved but the seal weld at the seat ring joints will also be stress relieved and further any machining strains which may have been put into the castings due to other machining operations will also be stress relieved at this time by heat treatment.

After the valve assembly has been suitably stress relieved, it will be removed from the furnace and the temporary stem which was used to hold the valve on its seat during the stress relieving operation will be removed and used in the construction of other valves. The permanent valve stem will then be inserted and the nut at the lower end of the stem will be put in place and seal-welded in position. After this the plug in the bottom of the valve body will be put in position but not seal-welded at this time because small particles or objects get into the pipe line during the course of construction which usually find their way to the lower side of the valve. After a short period of operation the plug can be removed and an inspection made and if the construction is found to be in satisfactory condition the plug will be screwed back into place and seal-welded so that the valve is entirely sealed for operation permanently.

While I have described with particularity a valve construction embodying my invention, it is to be understood that I reserve the right to all such changes as fall within the principles of my invention and the scope of the appended claims.

I claim:

1. A valve construction comprising a valve body provided with a through port and downwardly converging valve seats, a valve bonnet, a wedge-shaped valve provided with a hole extending lengthwise through said valve, a conical valve stem seat at each end of said hole, a valve stem extending through said hole and of smaller diameter than the diameter of said hole, conical seats carried by said valve stem for cooperation with the valve stem seats on said valve, said seats on said valve stem being spaced a greater distance apart than the valve stem seats on said valve, a back seating surface on the upper end of the valve, and a cooperating seat in said bonnet.

2. A valve construction comprising a valve body provided with a through port and valve seats, a valve bonnet, a valve provided with a hole extending lengthwise through said valve, a valve stem seat at each end of said hole, a valve stem extending through said hole and of smaller diameter than the diameter of said hole, seats carried by said valve stem for cooperation with the valve stem seats on said valve, said seats on said valve stem being spaced a greater distance apart than the valve stem seats on said valve, a back seating surface on the upper end of the valve, and a cooperating seat in said bonnet.

3. A valve construction comprising a valve body provided with a horizontal through port and valve seats and with an integrally connected upstanding bonnet provided with a hole slidably receiving a valve stem, a valve seated on said valve seats and provided with a hole extending from top to bottom, a valve stem extending through the hole in said bonnet and the hole in said valve, a shoulder on said valve stem cooperating with the upper end of said valve to seat said valve and of less diameter than that of the hole in the bonnet and a shoulder on said valve stem cooperating with the lower end of said valve to unseat said valve, said last mentioned shoulder being removable from the valve stem, and the bottom wall of said valve body being provided with a hole for access to and removal of said removable shoulder from said valve.

4. A valve construction comprising a main body provided with a through port and valve seats, a valve bonnet, a valve provided with a hole extending lengthwise therethrough, a valve stem seat at each end of said hole, a valve stem extending through said hole and of smaller diameter than the diameter of said hole, means on said valve stem cooperating with the seat at the upper end of said valve for forcing said valve against the valve seats in the valve body, and means carried by the lower end of said valve stem for cooperation with the seat at the lower end of said valve for effecting a fluid tight connection between said valve stem and said valve as said valve stem is raised and the valve drawn into engagement with said valve bonnet.

LESTER W. BENOIT.